United States Patent
Li

(10) Patent No.: US 9,146,891 B2
(45) Date of Patent: Sep. 29, 2015

(54) TIMING CONTROL CIRCUIT

(71) Applicant: ShenZhen Treasure City Technology Co., LTD., Shenzhen (CN)

(72) Inventor: Guang-Chen Li, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 242 days.

(21) Appl. No.: 13/924,629

(22) Filed: Jun. 24, 2013

(65) Prior Publication Data

US 2014/0173323 A1    Jun. 19, 2014

(30) Foreign Application Priority Data

Dec. 17, 2012    (CN) .......................... 2012 1 0548072

(51) Int. Cl.
*G06F 1/00* (2006.01)
*G06F 13/40* (2006.01)
*G06F 13/00* (2006.01)

(52) U.S. Cl.
CPC ............ *G06F 13/4068* (2013.01); *G06F 13/00* (2013.01)

(58) Field of Classification Search
CPC .............. G06F 1/08; G06F 1/10; G06F 1/04; G06F 1/3202; G06F 1/14; G06F 1/06; G06F 9/4825; G06F 11/0757; G06F 11/3419; H04L 25/14
USPC .................................. 713/500, 501, 502, 503
See application file for complete search history.

(56) References Cited

U.S. PATENT DOCUMENTS

| | | | |
|---|---|---|---|
| 3,962,680 A * | 6/1976 | Hirao ........................ 340/146.2 |
| 5,802,541 A * | 9/1998 | Reed ................................ 711/1 |
| 7,010,440 B1 * | 3/2006 | Lillis et al. ...................... 702/65 |
| 7,263,004 B2 * | 8/2007 | Chen ........................ 365/185.25 |
| 2008/0100545 A1 * | 5/2008 | Hong ............................. 345/82 |
| 2009/0128468 A1 * | 5/2009 | Yang et al. ...................... 345/87 |
| 2012/0036335 A1 * | 2/2012 | van Winkelhoff et al. .... 711/167 |
| 2012/0041706 A1 * | 2/2012 | Li ................................. 702/118 |

* cited by examiner

*Primary Examiner* — Zahid Choudhury
(74) *Attorney, Agent, or Firm* — Novak Druce Connolly Bove + Quigg LLP

(57) ABSTRACT

A timing control circuit includes a single chip having a plurality of output ports; a chip selecting circuit having a plurality of control ports connected to the output ports and paths; a signal input circuit; a signal output circuit; and a switching circuit including a plurality of signal channels. The chip selecting circuit generates a selection signal according to a control signal and outputs the selected signal via one of the selected paths. One of the channels is selected when a selection signal is output via the selected channel. When one of the signal channels is selected and there are signals inputted by the signal input circuit via the signal channel, the signals from the signal input circuit are passed to the signal output circuit through the signal channel and the light emitting diode in the signal channel is turned on.

7 Claims, 2 Drawing Sheets

TIMING CONTROL CIRCUIT

BACKGROUND

1. Technical Field

The present disclosure relates to timing control circuits and, more particularly, to a timing control circuit for testing production lines.

2. Description of Related Art

Timing control circuits used in production lines are often complicated and thus cause inconvenience for testing and repairing the production lines.

Therefore, it is desirable to provide a timing control circuit with simple construction for testing and repairing production lines.

BRIEF DESCRIPTION OF THE DRAWING

Many aspects of the present embodiments can be better understood with reference to the drawing. The components in the drawing are not necessarily drawn to scale, the emphasis instead being placed upon clearly illustrating the principles of the present embodiments.

DETAILED DESCRIPTION

Embodiments of the present disclosure will be described with reference to the drawings.

Figure 1:
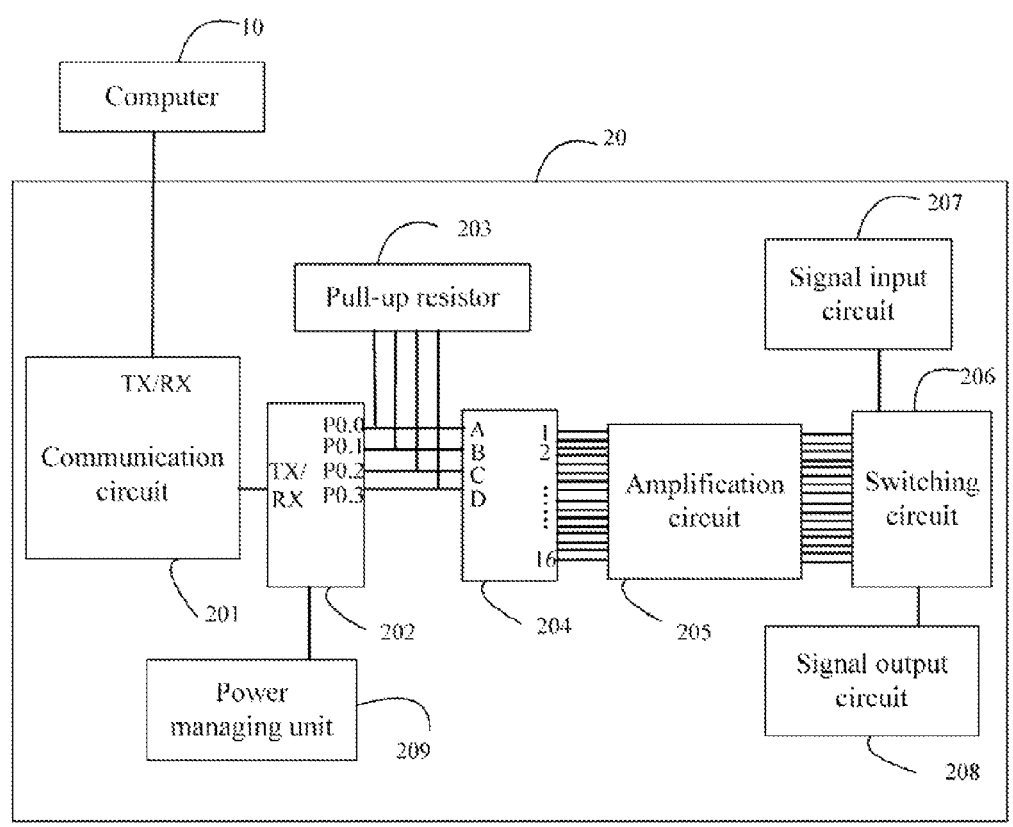
FIG. 1 is a schematic diagram showing a timing control circuit in an embodiment.

Referring to the FIG. 1, a timing control circuit 20 according to an embodiment is connected to a computer 10 and may be used in a production line. The computer 10 receives commands of the user in relation to the timing control circuit 20. The timing control circuit 20 includes a communication circuit 201, a single chip 202, a pull-up resistor 203, a chip selecting circuit 204, an amplification circuit 205, a switching circuit 206, a signal input circuit 207, and a signal output circuit 208.

The communication module 201 is connected to the computer 10 and the single chip 202 and permits communication between the computer 10 and the single chip 202. In detail, the communication module 201 has a transmit/receive port Tx/Rx. The communication module 201 transmits commands from the computer 10 to the single chip 202 using the transmit/receive port Tx/Rx.

The single chip 202 has several output ports, for example, four output ports P0.0, P0.1, P0.2, P0.3. The single chip 202 processes the command from the computer 10 and sets logic levels of the output ports P0.0, P0.1, P0.2, P0.3 to generate a control signal. For example, the single chip 20 sets the logic level of each of the output ports P0.0, P0.1, P0.2, P0.3 at a logic-low level "0", and thus a control signal "0000" is generated. In another example, the signal chip 202 sets the logic level of output ports P0.0, P0.1 at the logic-low level "0" and the logic level of the output ports P0.2, P0.3 at a logic-high level "1", and thus a control signal "0011" is generated.

The pull-up resistor 203 is connected to the output ports P0.0, P0.1, P0.2, P0.3 and sets the output ports P0.0, P0.1 at a logic-high level by default, thereby protecting the output ports P0.0, P0.1, P0.2, P0.3 when no command is input by the computer 10.

The chip selecting circuit 204 has several control ports and associated paths, for example, four control ports A, B, C, D and sixteen selectable paths 1-16. The control ports A, B, C, D are connected to the output ports P0.0, P0.1, P0.2, P0.3. The chip selecting circuit 204 generates a selection signal according to the control signal and outputs the selection signal in relation to one of the selectable paths 1-16. For example, if the control signal is "0000", the path 1 is selected and turned on and other paths are broken, such that the logic-high level is output from the selected path 1 while other non-selected paths output the logic-low level. If the control signal is "0001", the path 2 is selected and turned on and other paths are disconnected, and the logic-high signal is output from the selected path 2. Relationships between the control signal and the selected path are specified in the following table as an example:

| Control signal | Path selected |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

The amplification circuit 205 is connected between the paths 1-16 of the chip selecting circuit 204 and the switching circuit 206, and amplifies the selection signal.

Figure 2:
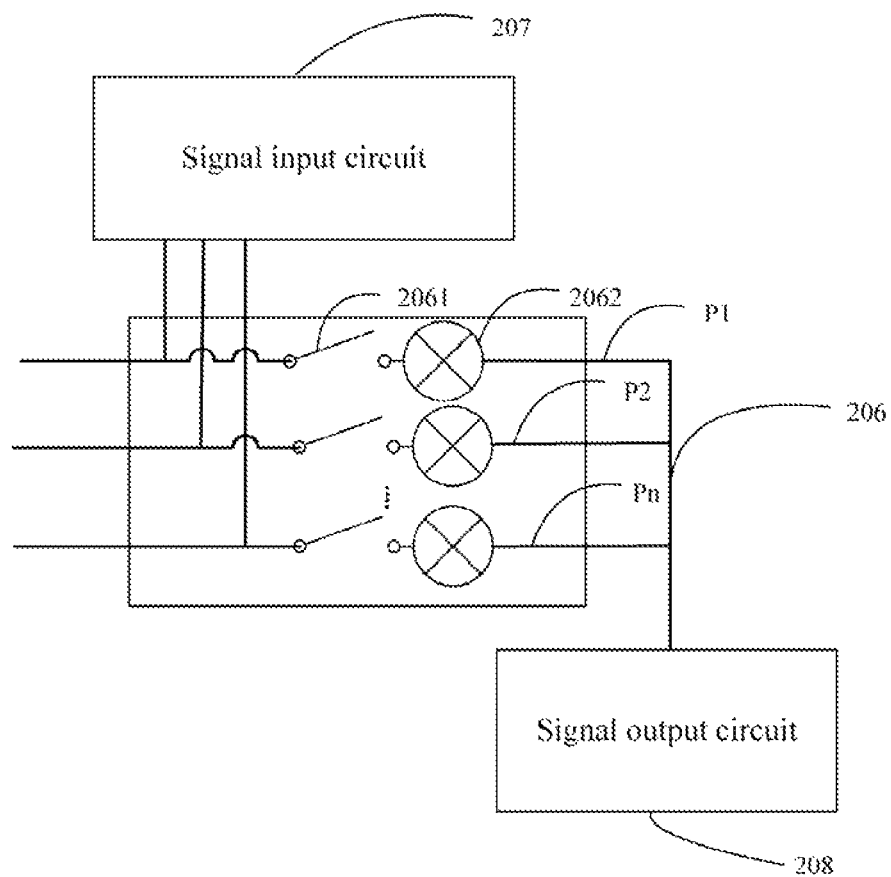
FIG. 2 is a schematic diagram showing switching circuit in the timing control circuit of FIG. 1.

Together with FIG. 2, the switching circuit 206 includes several signal channels P1, P2, . . . , Pn connected between the signal input circuit 207 and the signal output circuit 208. Each signal channel of channels P1, P2, . . . , Pn includes a relay 2061 and a light emitting diode 2062. Each relay 2061 includes a control terminal connected to one of the selectable paths 1-16 through the amplification circuit 205. One of the signal channels P1, P2, . . . , Pn is selected when the a corresponding selection signal is output via the selected signal channel. In detail, the switching circuit 206 includes sixteen signal channels P1, P2, . . . , P16, that is, sixteen relays 2061 and sixteen light emitting diodes 2062. When one signal channel Pn is selected and there are signals from the signal input circuit 207, the signals from the signal input circuit 207 are passed to the signal output circuit 208 through the signal channel while other unselected channels are blocked, and the light emitting diode 2061 in the signal channel Pn is turned on.

When testing production lines, the commands from the computer 10 are to control each of the signal channels P1, P2, . . . , Pn to be activated sequentially, a user can determine whether or not there are signals input by the signal input circuit 207 in each signal channel by seeing the light emitting diodes of each of the signal channels being turned on in the same sequence.

The timing control circuit 20 further includes a power managing unit 209 connected with the single chip 202, to convert an external power source into desired working voltages, to supply the single chip 202. For example, the power managing unit 209 may be an LM7805 to provide 5V to the single chip 202, or may be an LM7803 to provide 3V to the single chip 202.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A timing control circuit comprising:
   a single chip having a plurality of output ports, to process commands from a computer and generate a corresponding control signal by setting logic level of the output ports;
   a chip selecting circuit having a plurality of control ports connected to the output ports and a plurality of paths, to generate a select signal according to the control signal and output the select signal via one of the paths;
   a signal input circuit;
   a signal output circuit; and
   a switching circuit comprising a plurality of signal channels connected between the signal input circuit and the signal output circuit, wherein each signal channel comprises a relay and a light emitting diode, each relay comprises a control terminal connected to one of the paths; one of the signal channels is selected when the select signal is output via the signal channel; when one of the signal channels is selected and there are signals inputted by the signal input circuit via the signal channel, the signals from the signal input circuit are passed to the signal output circuit through the signal channel and the light emitting diode in the signal channel is turned on.

2. The timing control circuit of claim 1, further comprising a communication module connected to the computer and the single chip and configured to realize communication between the computer and the single chip.

3. The timing control circuit of claim 2, wherein the communication module has a transmit/receive port, the communication module transmits command from the computer to the single chip using the transmit/receive port.

4. The timing control circuit of claim 1, wherein the single chip has four output ports, the chip selecting circuit has four control ports and sixteen paths, and the switching circuit has sixteen signal channels.

5. The timing control circuit of claim 1, further comprising a pull-up resistor connected to the output ports and configured to set the output ports at logic-high level, thereby protecting the output ports when the computer does not input the commands.

6. The timing control circuit of claim 1, further comprising a power managing unit connected with the single chip, to convert external power source into desired working voltages to supply to the single chip.

7. The timing control circuit of claim 6, further comprising an amplification circuit connected between the ports of the chip selecting circuit and each relay of the switching circuit and configured to amplify the select signal, and send the amplified select signal to a connected relay.

* * * * *